G. E. ANDERSON.
MILKING APPARATUS.
APPLICATION FILED MAR. 3, 1910.

959,042.

Patented May 24, 1910.
2 SHEETS—SHEET 1.

WITNESSES
Frank Sheehy
W. C. Healy

INVENTOR
G. E. Anderson
BY James J. Phelps
Attorney

G. E. ANDERSON.
MILKING APPARATUS.
APPLICATION FILED MAR. 3, 1910.
959,042.
Patented May 24, 1910.
2 SHEETS—SHEET 2.
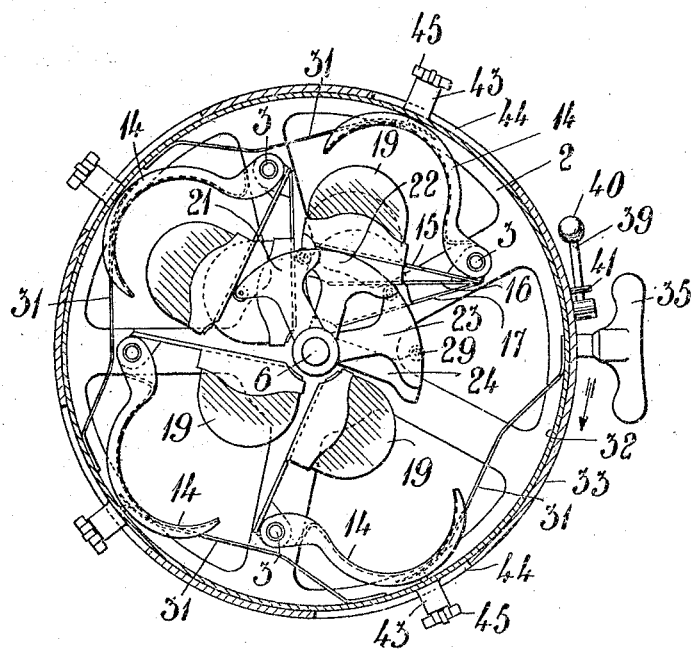
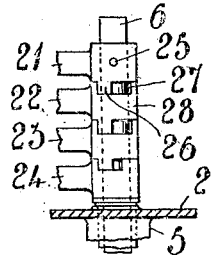
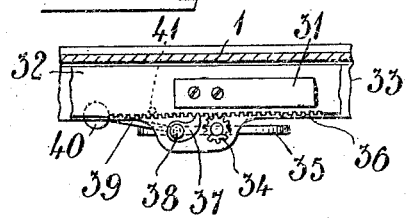
WITNESSES
Frank Sheehy
N. C. Healy
INVENTOR
G. E. Anderson
BY James Sheehy
Attorney

UNITED STATES PATENT OFFICE.

GUSTAF EMIL ANDERSON, OF STOCKHOLM, SWEDEN, ASSIGNOR TO JOHAN GEORG EUGEN SUNDBERG, OF STOCKHOLM, SWEDEN.

MILKING APPARATUS.

959,042.  Specification of Letters Patent.  Patented May 24, 1910.

Application filed March 3, 1910. Serial No. 547,064.

*To all whom it may concern:*

Be it known that I, GUSTAF EMIL ANDERSON, a citizen of the Kingdom of Sweden, residing at Stockholm, Sweden, have invented new and useful Improvements in Milking Apparatus, of which the following is a specification.

This invention relates to milking apparatus of the kind in which the milking members are actuated by a set of cams mounted on a central rotatable driving shaft and displaced in relation to each other so as to cause the milking members to compress the teats from the root and downward.

The object of the invention is to provide means by which the milking members can be adjusted in a convenient manner within wide limits for teats of different diameters, and my invention consists in a novel construction of the milking members and also in means for adjusting the outer parts thereof both simultaneously and independently of each other.

In the accompanying drawings I have shown one embodiment of my invention.

Figure 1:
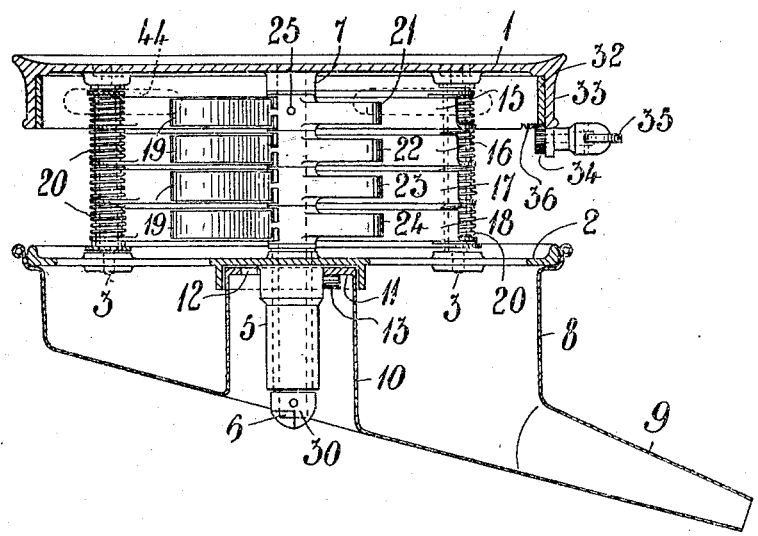
Figure 2:
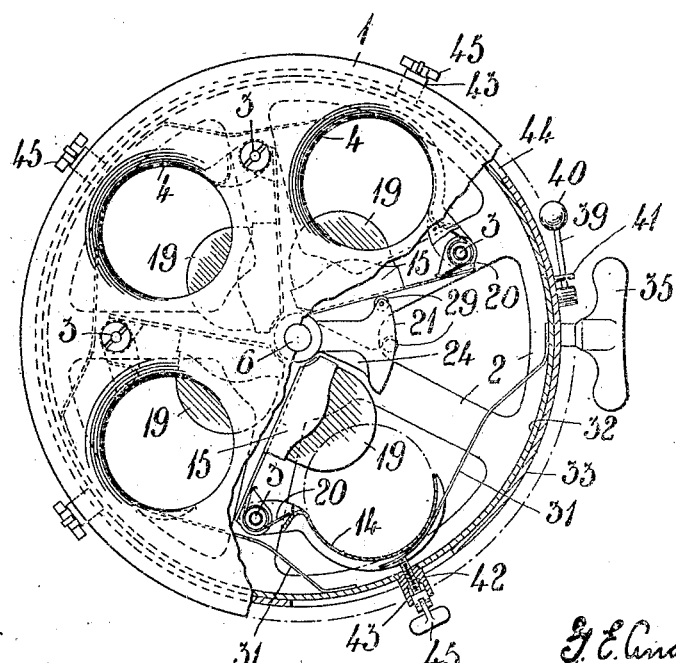

Figure 1 shows a vertical section of the apparatus. Fig. 2 shows a plan view and partial section of the apparatus, all milking members being shown in idle position. Fig. 3 shows a sectional plan view of the apparatus, two of the milking members being in working position. Figs. 4 and 5 show details.

The form of the apparatus illustrated in the drawings consists of an upper plate 1 and a lower wheel shaped plate 2 connected to each other by means of shafts 3. In the upper plate 1 are provided openings 4 corresponding to the teats. Rigidly attached to the lower plate 2 is a sleeve 5 in which is journaled the driving shaft 6, which is also journaled in a bearing 7 on the lower side of the upper plate 1. Below the plate 2 is provided a milk receiver 8 shown only in Fig. 1 and having a spout 9 and a central tube shaped portion 10 provided with an inwardly extending flange 11 having a radial slot 12 which corresponds to a pin 13 on the said sleeve 5 and permits the flange 11 to pass the said pin 13. When this is done and the milk receiver thereupon is turned, the pin 7 keeps the same in position.

Each milking member consists of an outer suitably curved plate 14 pivoted to one of the shafts 3 and of a number of arms 15, 16, 17, 18, for instance four, which may also be pivoted to the same shaft, the said arms supporting at their free ends cushions 19 of elastic material, such as india rubber. Each arm 15, 16, 17, 18 is actuated by a spiral spring 20 wound on each of the shafts 3 and bearing with the one end against the said arms and with the other end against the outer plate 14, said springs tending to turn the arms inward and the plates 14 outward.

For imparting movement to the arms 15, 16, 17, 18 is in well known manner used a number of cams 21, 22, 23, 24 mounted on the driving shaft 6 to partake in the rotating movement of the latter. The uppermost of said cams, the number of which corresponds to the number of arms 15, 16, 17, 18 of each milking member, is rigidly secured to the driving shaft 6 by means of a pin 25 or the like (Fig. 4), while the other cams are loosely mounted on the driving shaft. The uppermost cam 21 engages by means of a tooth or projection 26 a recess 27 in the nave portion 28 of the next lower cam 22, while the latter in similar manner is in engagement with the cam 23 and so on, as is clearly shown in Fig. 4. The recesses of the various nave portions of the cams are of such extension in peripheral direction that when the driving shaft is rotated to the left the cams will place themselves in a displaced position relative to each other as is shown in Fig. 3, so that the arms 15, 16, 17, 18 of each milking member will be actuated by the cams in order, commencing at the top. In order to reduce the friction the cams may be provided at their front ends with rollers 29. 30, Fig. 1, indicates the one part of coupling by means of which the driving shaft 6 may be connected to a flexible shaft or the like (not shown) for transmitting driving power to the said shaft 6.

The outer plates 14 of the milking members bear each against an abutment preferably in the shape of a curved spring plate 31 which is rigidly secured at the one end to a rotatable ring 32 placed inside a downwardly extending flange 33 of the upper frame plate 1. The said ring 32 may be rotated by any suitable means, for instance a pinion 34 the axle of which has a handle 35 and which engages a toothed portion 36 of the ring 32. For locking the ring 32 in position is used a pawl 37 engaging the said toothed portion 36 of the ring 32 and having on its pivot 38 a lever 39 provided with a weight 40 which tends to keep the pawl in engagement with the ring 32. When the ring 32 is to be rotated, the lever 39 is raised until it strikes a stop pin 41 and by this movement of the lever 39 the pawl is turned downward out of engagement with the toothed portion 36. When the ring 32 is rotated in the direction of the arrow in Fig. 3 from the position shown the spring plates 31 will, as is easily understood, turn the plates 14 inward, while the latter when the ring 32 is rotated in opposite direction will move outward under the action of the spiral springs 20. In this way the milking members can be easily and accurately adjusted according to the diameter or thickness of the teats. The object of using springy or yielding abutments 31 for the plates 14 is to prevent the teats from being injured by too strong compression.

For adjusting the milking members independently of each other which is necessary when the teats of a cow are of very different diameters screws 42 are provided which bear with their inner ends against the free ends of the spring plates 31. The said screws are inserted through studs 43 secured to the ring 32 and engaging horizontal slots 44 in the flange 33 thereby serving to guide and support said ring 32. The wing shaped heads 45 of the screws 42 may be hinged to the latter as shown. When a milking member, viz. the outer part thereof need be adjusted separately, the corresponding screw 42 is turned in the one direction or the other, whereby the position of the corresponding spring plate 31 and thus of the corresponding plate 14 is varied.

The milking apparatus now described works as follows: Before the apparatus is placed on the teats of a cow the driving shaft 6 is rotated to the right until all cams 21, 22, 23, 24 come into alinement with each other in vertical direction between two milking members as is shown in Fig. 2, so that the teats can freely enter into the milking members. When the apparatus has been placed on the teats, the driving shaft is rotated in the opposite direction, viz. to the left, and the cams 21, 22, 23, 24 will now in well known manner operate the arms 15, 16, 17, 18 of each milking member in order, commencing at the top. If the degree of compression of the teats need be varied, the ring 32 is rotated in the one direction or the other as described above, and if one or more of the milking members need be adjusted separately, the corresponding screw or screws 42 is or are operated in the manner described.

Having now described my invention, what I claim as new and desire to secure by Letters Patent is:

1. In a milking apparatus the combination with a central driving shaft and a set of cams thereon, of milking members each consisting of a set of pivoted arms and an outer adjustable plate, substantially as and for the purpose set forth.

2. In a milking apparatus the combination with a central driving shaft and a set of cams thereon, of milking members each consisting of a set of pivoted arms and an outer adjustable plate, and means for adjusting said outer plates simultaneously, substantially as and for the purpose set forth.

3. In a milking apparatus the combination with a central driving shaft and a set of cams thereon, of milking members each consisting of a set of pivoted arms, elastic cushions on said arms and an outer adjustable plate, a rotatable ring, abutments on said ring bearing against said outer plates, and means for rotating said ring, substantially as and for the purpose set forth.

4. In a milking apparatus the combination with a central driving shaft and a set of cams thereon, of milking members each consisting of a set of pivoted arms and an outer adjustable plate, a rotatable ring, spring plates on said ring bearing against said outer plates, means for rotating said ring, and means for locking the latter in position, substantially as and for the purpose set forth.

5. In a milking apparatus the combination with a central driving shaft and a set of cams thereon, of milking members each consisting of a set of pivoted arms and an outer adjustable plate, means for adjusting said outer plates simultaneously, and means for adjusting said plates independently of each other, substantially as and for the purpose set forth.

6. In a milking apparatus the combination with a central driving shaft and a set of cams thereon, of milking members each consisting of a set of pivoted arms and an outer adjustable plate, a rotatable ring, abutments on said ring bearing against said outer plates, means for rotating said ring, and means for adjusting said outer plates independently of each other, substantially as and for the purpose set forth.

7. In a milking apparatus the combination with a central driving shaft and a set of cams thereon, of milking members each consisting of a set of pivoted arms, elastic cushions on said arms and an outer adjustable plate, a rotatable ring, spring plates on said ring bearing against said outer plates, means for rotating said ring, means for locking the latter, and means for adjusting the said outer plates independently of each other, substantially as and for the purpose set forth.

8. In a milking apparatus the combination with a central driving shaft and a set of cams thereon, of milking members each consisting of a set of pivoted arms, elastic cushions on said arms and an outer adjustable plate, a rotatable ring, spring plates on said ring bearing against said outer plates, means for rotating said ring, means for locking the latter, and adjusting screws in said ring bearing against said spring plates, substantially as and for the purpose set forth.

In testimony whereof I have signed my name to this specification in the presence of two subscribing witnesses.

GUSTAF EMIL ANDERSON.

Witnesses:
   EDWARD ELMAN,
   HILDUE HÅKAUSON.